United States Patent Office 3,476,656
Patented Nov. 4, 1969

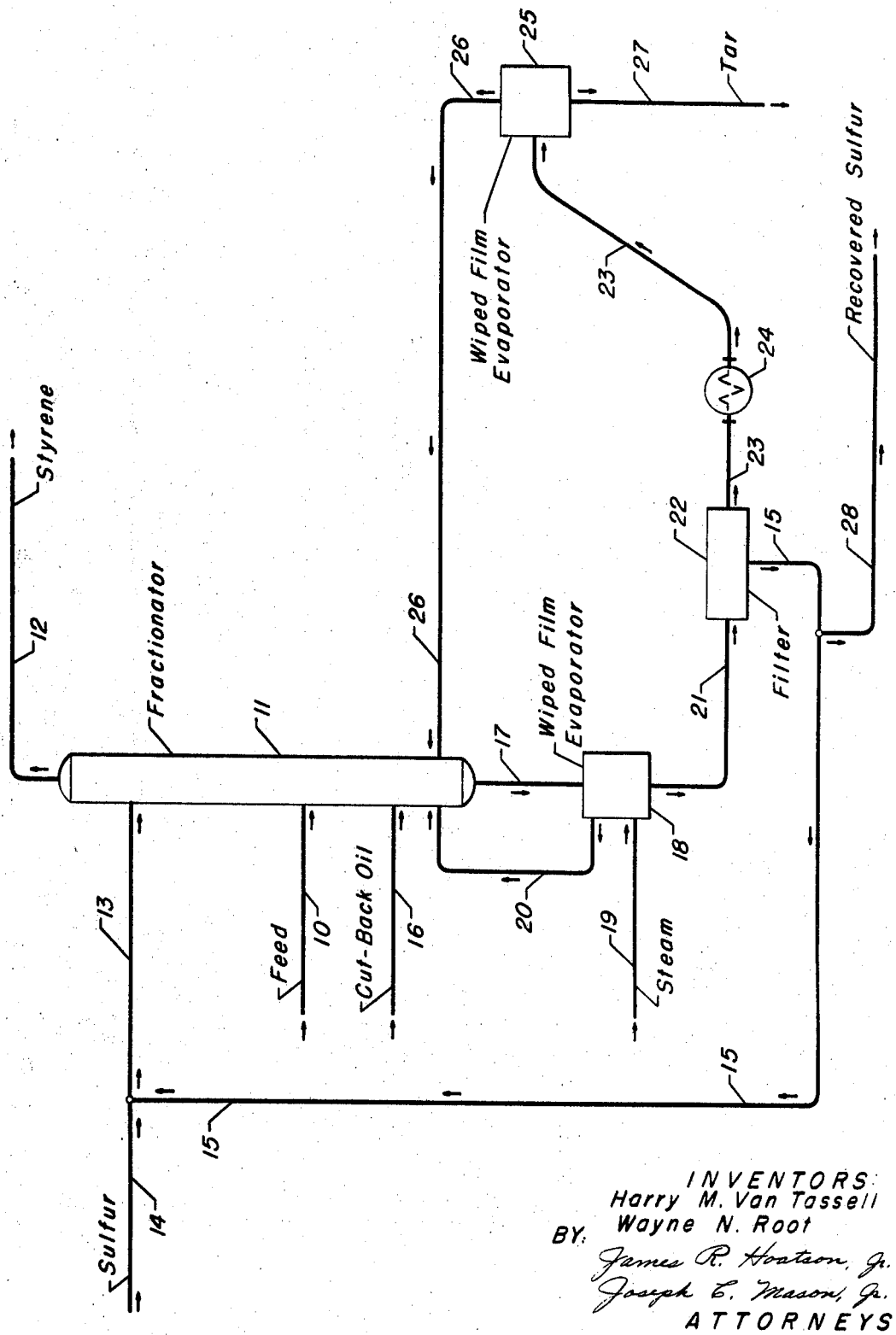

3,476,656
FRACTIONAL DISTILLATION AND RECOVERY OF STYRENE CONTAINING SULFUR WITH SUBSEQUENT BOTTOMS SEPARATION
Harry M. Van Tassell and Wayne N. Root, Des Plaines, Ill., assignors to Universal Oil Products Company, Des Plaines, Ill., a corporation of Delaware
Filed June 7, 1968, Ser. No. 735,425
Int. Cl. B01d 3/34; C07c 7/04
U.S. Cl. 203—9
9 Claims

ABSTRACT OF THE DISCLOSURE

Method for purifying sulfur-inhibited styrene via a distillation scheme having associated therewith sulfur recovery facilities. The crude styrene is distilled in the presence of a cut-back oil, a high purity styrene is recovered as overhead, the bottoms product is treated in a separation zone to recover residual styrene as a gaseous stream and a separate liquid is further treated to separate a solid sulfur stream therefrom. A portion of the sulfur is recycled to the distillation zone.

Background of the invention

This invention relates to a fractionation scheme. It particularly relates to a distillation method for purifying sulfur-inhibited styrene. It also relates to a method for recovering styrene in high purity via a distillation scheme having associated therewith sulfur recovery facilities.

It is known in the prior art that styrene can be recovered from the normally liquid effluent of an ethylbenzene dehydrogenation reaction zone by a complicated series of fractionation columns. Usually, the last fractionation column in this train comprises a styrene purification column which operates to remove the last vestiges of contaminants, such as tars and/or other polymeric materials from the styrene. Since styrene tends to undergo polymerization by the application of heat, it is well known that a certain degradation in styrene quality will occur throughout the distillation recovery facilities. Therefore, the prior art processing techniques have utilized, to a considerable extent, various styrene polymerization inhibitors, such as molten sulfur, tertiarybutylcatechol, etc. It is usual practice in the prior art to recover styrene as an overhead distillate product from the final distillation column. The residue material from such a column, therefore, contains tars, polymers and sulfur. The residue has very little commercial value and the prior art has experienced considerable difficulty in disposing of this waste material.

Accordingly, it would be desirable if an improved method for recovering styrene could be developed which also solved the waste disposal problem.

Summary of the invention

Accordingly, it is an object of this invention to provide a fractionation method.

It is another object of this invention to provide an improved method for recovering styrene in high purity via distillation.

It is a specific object of this invention to provide a distillation method for recovering styrene in high purity while simultaneously recovering the normally solid polymerization inhibitor, sulfur, for reuse in the process.

One embodiment of the present invention, therefore, provides a method for purifying styrene which comprises introducing crude styrene into a distillation zone maintained under distillation conditions including the presence of hereinafter specified normally solid sulfur as a polymerization inhibitor; withdrawing from said zone an overhead product stream comprising high purity styrene; introducing relatively non-volatile hydrocarbons into said zone; removing residuum including said sulfur, said non-volatile hydrocarbons, and a minor amount of styrene from said zone as a bottoms fraction; passing said bottoms fraction into a first separation zone under conditions sufficient to produce a gaseous fraction comprising styrene and a first liquid fraction comprising non-volatile hydrocarbons having sulfur contained therein; introducing said first liquid fraction into a second separation zone under conditions sufficient to produce a solids fraction comprising sulfur and a second liquid fraction comprising non-volatile hydrocarbons; and returning at least a portion of said solids fraction to said distillation zone as specified.

A more limited embodiment of the present invention includes the method hereinabove wherein said first separation zone comprises forming a thin flowing film of said bottoms fraction and subjecting said film to conditions sufficient to vaporize styrene therefrom.

A still further limited embodiment of this invention includes the method hereinabove wherein said second separation zone comprises a chilled filtration zone.

In essence, therefore, it can be seen from the above embodiments that the present invention utilizes in its preferred embodiment a thin film evaporation technique operating in conjunction with a filter (or solvent extraction) to separate and recover the polymerization inhibitor (e.g. sulfur) for reuse in the process.

As previously mentioned, the present invention has particular application in the recovery of styrene which has been made through the conventional catalytic dehydrogenation of ethylbenzene. Those skilled in the art recognize the importance of being able to produce styrene economically since this chemical is extensively employed throughout commerce as a raw material for the production of resins, plastics and elastomers. Specifically, styrene can be copolymerized with butadiene to produce high molecular weight synthetic rubber. In limited quantities, styrene may be recovered from various coal tars and crude oils. However, in recent times, the preferred commercial method is through the dehydrogenation of ethylbenzene. The raw material, ethylbenzene, can either be separated from petroleum fractions by superdistillation or can be synthetically prepared, such as through the alkylation of benzene with ethylene or ethanol. The distillation method of the present invention, however, is not to be limited by the sources from which the styrene is available. In other words, the present invention is applicable to any feedstock containing primarily styrene which is contaminated with various polymeric materials and tars and, in particular, contains sulfur as a polymerization inhibitor.

The prior art methods for producing styrene are, generally, carried out by passing a mixture of ethylbenzene and steam over a fixed bed of dehydrogenation catalyst. Since the basic chemical reaction involved is endothermic in nature, there is associated with the reaction a significant decrease in the reaction zone temperature. Therefore, in the dehydrogenation of ethylbenzene to styrene, significant quantities of steam are necessary for use as a heat carrier, as a diluent, and as a catalyst revivifier. Typically, this amount of steam will vary from about 2 to 4 pounds of steam per pound of ethylbenzene charged into the reaction zone. Those skilled in the art are familiar with the broad concept of producing styrene via the dehydrogenation of ethylbenzene, so a description of such a process need not be presented in detail herein.

The advantages of the inventive method will be more clearly understood with reference to the attached drawing which is a schematic representation of the process flow illustrating the preferred embodiment of the invention.

Description of the drawing

With reference now to the attached drawing, a styrene-containing feedstock consisting primarily of styrene which is contaminated with minor quantities of tars and other polymeric materials and which, preferably, contains normally solid sulfur as a polymerization inhibitor, enters the method of the present invention via line 10. As used herein, the term "crude styrene" is intended to include any feed mixture containing primarily styrene, but which is contaminated with undesirable quantities of non-styrene monomer components including tars and/or polymeric materials herein collectively referred to as "polymers" or "polymeric material." The feed material into the system may not, at this point, necessarily contain sulfur as the polymerization inhibitor. As will become evident from the description presented hereinbelow, it is only a requirement of the present invention that the distillation of styrene be performed in the presence of sulfur. The crude styrene is passed via line 10 into fractionating column 11 which contains suitable vapor-liquid contacting devices, such as bubble cap trays, perforated trays, valve trays, etc. Operating conditions in fractionator 11 are sufficient to produce as an overhead product high purity styrene comprising at least 99% by weight styrene which is removed from column 11 via line 12 for further handling in accordance with practices well known to those skilled in the art. If desired, the finished pure styrene, before being sent to storage, may have added thereto another inhibitor, such as tertiarybutylcatechol.

In accordance with this invention, normally solid sulfur is introduced into fractionator 11 via lines 14 and 13 in an amount sufficient to inhibit the polymerization of the styrene during the distillation process. Additional amounts of sulfur for use as a polymerization inhibitor is also introduced into fractionator 11 from line 15, the source of which is more fully described hereinbelow. However, sulfur may be introduced with the feed mixture since styrene polymerization is a problem in all processing equipment prior to this recovery column. It is also a requirement of the present invention that a cut-back oil be introduced into fractionator 11 via line 16 into the lower portion of the distillation column.

A bottoms fraction comprising the cut-back oil, polymeric material, sulfur, and minor amounts of styrene is withdrawn from fractionator 11 via line 17.

As used herein, the terms "cut-back oil," "relatively non-volatile hydrocarbon," and other words of similar import are intended to be any relatively heavy hydrocarbon materials and, typically, may be a relatively heavy aromatic hydrocarbon, such as isopropylbenzene or polyethylbenzene. By way of emphasis, it is contemplated by the present invention that the cut-back oil may be any relatively heavy oil. The purpose of the cut-back oil is to keep the viscosity of the bottoms stream from exceeding pumpable limits. The cut-back oil also provides a means for recovering the maximum amount of styrene from the feed material. Also, as used herein, the term "relatively non-volatile," as comprising the cut-back oil, is intended to include a property of the cut-back oil whereby no significant amount of cut-back oil vapors would pass up the column to contaminate the styrene which is being withdrawn as an overhead distillate product. It is not intended to mean that the cut-back oil cannot be vaporized under other conditions than those maintained in fractionator 11 as will become more evident from the additional descriptive material presented hereinbelow.

Returning now to the bottoms stream in line 17: this residual fraction is now passed into separation zone 18 which, preferably, is a conventional wiped or agitated film evaporator. Therefore, in separator 18, the bottoms stream is formed into a thin film of liquid material containing normally solid sulfur which is then desirably contacted by a rotating assembly of wipers which either meets a close clearance with the wall or which may actually ride on the film of liquid on the wall. The conditions are maintained in evaporator 18 which are sufficient to vaporize the previously mentioned minor amount of styrene. The vaporized styrene is removed from evaporator 18 and, preferably, returned to fractionator 11 via line 20 for further recovery of the styrene therein.

In addition, one embodiment of the invention includes sweeping the thin film of bottoms material with an inert gas stream, such as nitrogen or steam, which enters evaporator 18 via line 19. The carrier gas is then also removed from evaporator 18 via line 20 and carries with it the vaporized styrene for further recovery as previously mentioned hereinabove. It is important to note that the conditions sufficient to vaporize styrene in evaporator 18 should not include conditions which will vaporize, to any significant extent, the cut-back oil which was added to the system via line 16.

The bottoms stream having a reduced styrene content is withdrawn from evaporator 18 and passed via line 21 into another separation zone 22 which, preferably, is a conventional rotary drum filter. If desired, conventional filter aids may also be used. In a distinctly preferred embodiment of this invention, filter 22 operates at a substantially low temperature, e.g. sufficient chilling has been provided by means not shown to render the sulfur into distillate solid particles which will agglomerate as part of the filter cake in filter 22. It is to be understood, however, that in place of filter 22, simple decantation, centrifugation, or additional solvent extraction techniques may be employed. The filter cake representing the solid product from filtering device 22 is withdrawn via line 15 and desirably sent to a sulfur melter, not shown, wherein any hydrocarbons entrained or trapped in the solid product are stripped off. The molten sulfur is then passed via line 15 into fractionator column 11, as previously described, in an amount sufficient to inhibit the polymerization of styrene during the distillation process. Any excess sulfur which is obtained and not needed in the distillation process may be withdrawn from the system via line 28. Even though the invention has been described as returning the separated sulfur to the fractionation column, it is to be understood that the term "returned to the fractionation column" or words of similar import is intended to include returning such sulfur to any portion of the process whereby ultimately the returned sulfur is present at least in part in the fractionation column.

The filtrate for filter 22 is withdrawn via line 23 and at this point comprises the non-volatile hydrocarbon or cut-back oil containing the tars or other polymeric materials which were contaminants in the styrene feed mixture. This relatively solids-free filtrate is now heated in heater 24 and passed into separation zone 25 which may be a flash chamber or which, preferably, is another wiped or agitated film evaporator. Suitable conditions are maintained in evaporator 25 which will substantially vaporize the cut-back oil which is then removed from evaporator 25 via line 26 and, preferably, returned to fractionator 11 as at least part of the cut-back oil which is required for proper operation of the system. The final residue material containing the tars and polymeric materials are removed from the process via line 27. If needed, by means not shown, additional diluent or cut-back oil may be introduced into line 27 to aid in pumping this residue from the system.

The evaporators described herein may be chosen from a wide variety of wiped or agitated film evaporator devices available commercially. Representative of manufacturers of such evaporators are Luwa, Pfaudler, Rodney-Hunt, and others.

Preferred embodiment

A preferred embodiment of the present invention includes the method for recovering styrene in high purity via distillation which comprises the steps of: (a) introducing a feed mixture comprising styrene contaminated with non-styrene monomer material into a fractionation column maintained under distillation conditions including the presence of normally solid sulfur as a styrene polymerization inhibitor, a temperature from 100° F. to 200° F., and a pressure from 10 to 100 mm. Hg absolute; (b) introducing relatively non-volatile hydrocarbons into the lower portion of said column as cut-back oil therein; (c) withdrawing from said column an overhead stream comprising at least 99% by weight styrene; (d) withdrawing from said column a bottoms stream comprising said relatively non-volatile hydrocarbon, polymeric material, sulfur, and minor amounts of styrene; (e) forming a thin film of said bottoms stream under conditions sufficient to vaporize styrene from said film and returning the vaporized styrene to said column; (f) passing the bottoms stream having reduced styrene content into a chilled filtration zone and removing from said filtration zone a solids product stream comprising sulfur and a filtrate stream comprising said relatively non-volatile hydrocarbon and polymeric materials; (g) returning at least a portion of said solids product stream to Step (a) as at least part of the sulfur present in said fractionation column; (h) introducing said filtrate into a separation zone under conditions sufficient to produce a gaseous fraction comprising said non-volatile hydrocarbon, and a residue fraction comprising said polymeric material; and, (i) returning said gaseous fraction of Step (h) to Step (b) as at least part of said cut-back oil.

We claim:

1. Method for purifying styrene which comprises introducing crude styrene into a distillation zone maintained under distillation conditions including the presence of hereinafter specified normally solid sulfur as a polymerization inhibitor; withdrawing from said zone an overhead product stream comprising high purity styrene; introducing relatively non-volatile hydrocarbons into said zone; removing residuum including said sulfur, said non-volatile hydrocarbons, and a minor amount of styrene from said zone as a bottoms fraction; passing said bottoms fraction into a first separation zone under conditions sufficient to produce a gaseous fraction comprising styrene, and a first liquid fraction comprising non-volatile hydrocarbons having sulfur contained therein; introducing said first liquid fraction into a second separation zone under conditions sufficient to produce a solids fraction comprising sulfur, and a second liquid fraction comprising non-volatile hydrocarbons; and, returning at least a portion of said solids fraction to said distillation zone as specified.

2. Method according to claim 1 wherein said first separation zone comprises forming a thin flowing film of said bottoms fraction and subjecting said film to conditions sufficient to vaporize styrene therefrom.

3. Method according to claim 2 wherein said film is subjected to a flowing hot gaseous stream.

4. Method according to claim 3 wherein said gaseous stream comprises steam.

5. Method according to claim 2 wherein said second separation zone comprises a chilled filtration zone.

6. Method for recovering styrene in high purity via distillation which comprises the steps of:
(a) introducing a feed mixture comprising styrene contaminated with non-styrene monomer material into a fractionation column maintained under distillation conditions including the presence of normally solid sulfur as a styrene polymerization inhibitor, a temperature from 100° F. to 200° F., and a pressure from 10 to 100 mm. Hg absolute;
(b) introducing relatively non-volatile hydrocarbons into the lower portion of said column as cut-back oil therein;
(c) withdrawing from said column an overhead stream comprising at least 99% by weight styrene;
(d) withdrawing from said column a bottoms stream comprising said relatively non-volatile hydrocarbon, polymeric material, sulfur, and minor amounts of styrene;
(e) forming a thin film of said bottoms stream under conditions sufficient to vaporize styrene from said film and returning the vaporized styrene to said column;
(f) passing the bottom stream having reduced styrene content into a chilled filtration zone and removing from said filtration zone a solids product stream comprising sulfur and a filtrate stream comprising said relatively non-volatile hydrocarbon and polymeric material;
(g) returning at least a portion of said solids product stream to Step (a) as at least part of the sulfur present in said fractionation column;
(h) introducing said filtrate into a separation zone under conditions sufficient to produce a gaseous fraction comprising said non-volatile hydrocarbon, and a residue fraction comprising said polymeric material; and,
(i) returning said gaseous fraction of Step (h) to Step (b) as at least part of said cut-back oil.

7. Method according to claim 6 wherein said thin film is subjected to a flowing inert gaseous stream selected from the group consisting of steam and nitrogen.

8. Method according to claim 7 wherein said inert gas comprises steam.

9. Method according to claim 8 wherein said separation zone of Step (h) comprises forming a thin flowing film of said filtrate and subjecting said film to conditions sufficient to vaporize cut-back oil therefrom.

References Cited

UNITED STATES PATENTS

| | | | |
|---|---|---|---|
| 2,389,793 | 11/1945 | Livingston | 203—48 |
| 2,556,030 | 6/1951 | Coulter et al. | 203—69 |
| 2,807,572 | 9/1957 | Zoller et al. | 203—47 |
| 2,895,886 | 7/1959 | Schneider | 203—72 |
| 3,084,108 | 4/1963 | Randall. | |
| 3,222,263 | 12/1965 | Campbell | 203—9 |
| 3,378,467 | 4/1968 | Colton et al. | 203—72 |
| 3,408,264 | 10/1968 | Ward | 203—9 |

FOREIGN PATENTS 900,457   7/1962   Great Britain.

WILBUR L. BASCOMB, JR., Primary Examiner

U.S. Cl. X.R.

23—224; 203—79, 80, 72, 69, 89, 47, 88, 49; 260—669